United States Patent [19]
Clark et al.

[11] Patent Number: 5,625,333
[45] Date of Patent: Apr. 29, 1997

[54] BEND SENSOR HORN SWITCH ASSEMBLY

[75] Inventors: Marcus T. Clark, Kaysville; Howard W. Hambleton, Jr., South Ogden; Kevin W. Booth, Roy, all of Utah

[73] Assignee: Morton International, Inc., Chicago, Ill.

[21] Appl. No.: 532,433

[22] Filed: Sep. 22, 1995

[51] Int. Cl.$^6$ ........................................... G01L 1/22
[52] U.S. Cl. ........................... 338/2; 338/209; 338/210; 338/6
[58] Field of Search ................. 338/2, 6, 47, 50, 338/113, 114, 209, 210, 211

[56] References Cited

U.S. PATENT DOCUMENTS

| | | | |
|---|---|---|---|
| 2,445,660 | 7/1948 | Bruestle | 338/114 |
| 2,508,456 | 5/1950 | Gustafsson | 338/2 |
| 3,031,634 | 5/1962 | Van Der Lely et al. | 338/2 |
| 4,374,374 | 2/1983 | Goof | 338/114 |
| 4,677,417 | 6/1987 | Amagishi | 338/114 |
| 4,765,422 | 8/1988 | Hoffmann | 177/211 |
| 4,996,511 | 2/1991 | Ohkawa et al. | 338/114 |
| 5,086,785 | 2/1992 | Gentile et al. | 128/782 |
| 5,157,372 | 10/1992 | Langford | 338/211 |
| 5,162,775 | 11/1992 | Kuramochi et al. | 338/114 |
| 5,164,697 | 11/1992 | Kramer | 338/69 |
| 5,309,135 | 5/1994 | Langford | 338/211 |
| 5,351,542 | 10/1994 | Ichimura et al. | 73/514.33 |
| 5,398,962 | 3/1995 | Kropp | 280/731 |
| 5,523,532 | 6/1996 | Leonelli et al. | 200/61.54 |

Primary Examiner—Teresa J. Walberg
Assistant Examiner—Karl Easthom
Attorney, Agent, or Firm—George W. Rauchfuss, Jr.; Gerald K. White

[57] ABSTRACT

A horn switch assembly including an airbag module cover, a bend sensor and a backing plate. The module cover has a front outer face and a rear inner face deformably depressible from the front face. A plurality of parallel, spaced-apart, elongated force concentration ribs are located on the rear inner face of the cover. The bend sensor is positioned under the force concentrators and includes a flexible substrate and a variable resistance circuit connectable to a horn control circuit. The variable resistance circuit has a plurality of spaced-apart resistive elements connected by a plurality of conductive strips. The variable resistance circuit is arranged in a plural of parallel spaced-apart columns adhered to the substrate so that the columns are generally perpendicular to the force concentration ribs and each resistive element is positioned under a force concentration rib. The generally rigid backing plate has a forward surface positioned under the bend sensor. A plurality of parallel spaced-apart elongated support ribs extend forwardly from the backing plate so that the support ribs are generally parallel to and offset from the force concentration ribs and are generally perpendicular to the bend sensor columns so that each conductive strip is positioned over a support rib and each resistive element is positioned between two adjacent support ribs. Pressure applied to the front outer face of the airbag module cover will deformably depress the inner face towards the bend sensor causing at least one force concentration rib to bend at least one resistive element about two adjacent support ribs.

12 Claims, 1 Drawing Sheet

BEND SENSOR HORN SWITCH ASSEMBLY

FIELD OF THE INVENTION

The present invention relates to a horn switch assembly. More particularly, the present invention relates to a mechanical actuation system for a bend sensor horn switch.

BACKGROUND OF THE INVENTION

Driver side airbag modules, which include an airbag cushion and an airbag module cover, are normally positioned within a hub of a steering wheel of an automobile. This happens to be the same area which conventionally includes the horn actuation switch. Accordingly, the airbag module cover must additionally serve to actuate the horn switch, preferably over a substantial area.

The introduction of the airbag module at the steering wheel hub complicated the design of the horn switch and the airbag module cover. The horn switch should not be susceptible to inadvertent actuation due to thermal expansion or contraction of the cover, curvature of the cover or close packing of the horn switch and a folded airbag cushion beneath the cover. In addition, the horn switch should not require a large degree of cover depression to be activated.

A number of horn switch designs have included a membrane type switch. Membrane switches conventionally comprise two very thin sheets having conductive coatings which are normally separated by thin spacers. Pressure on the switch pushes the conductive surfaces together to close a circuit and actuate the horn. The membrane switch is normally attached to the back of the airbag module cover which is depressed from the front by the driver to apply pressure to the horn switch. Various problems have been encountered in providing membrane switches that activate the horn in response to a force within a desired range, and membrane switches have the tendency to require an inconsistent amount of force to close.

In an attempt to overcome these problems, an existing horn switch assembly described in U.S. Pat. No. 5,309,135 uses a flexible potentiometer as a horn switch. The potentiometer is adhered to a flexible substrate which is adhered to the back of an airbag module cover. The resistance of the flexible potentiometer changes as it bends in response to a driver pressing against the module cover. A horn control circuit responds to extremely rapid changes in the resistance of the flexible potentiometer, but not to more gradual changes caused by, for example, temperature changes. However, because the potentiometer can bend or wrinkle in more than one axis or direction, the '135 horn switch assembly also requires an inconsistent amount of force to activate.

Some horn switch assemblies include a bend sensor. A bend sensor is similar to a potentiometer and includes a bend sensitive variable resistance circuit that is adhered to a flexible substrate. The resistance of the variable resistance circuit measurably changes as it is bent and the circuit is connectable to a horn control circuit that responds to rapid changes in resistance but not to more gradual changes. The variable resistance circuit works best when it is bent in only one axis or direction. However, existing horn switch assemblies incorporating a bend sensor have not been able to translate driver-applied force to the bend sensor so that the variable resistance circuit bends in only one direction. Because the circuit bends in more than one direction and wrinkles, the horn switch requires more driver-applied force to be activated. Additionally, these horn switch assemblies fail to translate a localized driver applied force to the cover over a greater area of the bend sensor.

In summary, providing a horn switch assembly that does not require an unreasonable degree of cover depression or an unreasonable amount of applied pressure for actuation, and is not susceptible to inadvertent actuation resulting from thermal expansion or contraction of the airbag module cover, curvature of the cover or close packing of the horn cover and a folded airbag cushion beneath the cover would be useful and desirable. More specifically, it would be preferably to provide a horn switch assembly utilizing a bend sensor wherein any localized applied force is distributed over a larger area of the bend sensor and the bend sensor is only allowed to bend in substantially one axis or direction.

SUMMARY OF THE INVENTION

An object, therefore, of the present invention is to provide a horn switch assembly that requires only a reasonable degree of airbag module cover depression to be actuated.

Another object of the present invention is to provide a horn switch assembly that can be actuated by a reasonable amount of driver applied force over a wide range of temperatures.

An additional object of the present invention is to provide a horn switch assembly that is not susceptible to inadvertent actuation due to thermal expansion or contraction of the airbag module cover at extreme temperatures.

A further object of the present invention is to provide a horn switch assembly that requires a consistent amount of pressure for actuation that does not vary substantially with ambient temperature.

In carrying out this invention, there is provided an improved horn switch assembly incorporating a bend sensor for mounting on a steering wheel of a motor vehicle. The horn switch assembly comprises an airbag module cover having a front outer face and a rear inner face, and a substantially rigid backing plate positioned so that a forward surface of the backing plate faces the rear inner face of the module cover. A flexible bend sensor connectable to a remote horn control circuit that responds to a threshold rate of change of resistance is positioned between the rear inner face of the module cover and the forward surface of the backing plate. Thus pressure applied to the front outer face of the module cover causes at least one of a plurality of resistive elements in the bend sensor to bend and rapidly change resistance so that the remote horn control circuit activates a horn.

The improvement comprises a plurality of spaced-apart force concentrators on the rear inner face of the cover extending rearwardly therefrom and positioned so that each resistive element of the bend sensor is positioned under a force concentrator, and a plurality of spaced-apart supports on the forward surface of the backing plate, extending forwardly therefrom and arranged so that so that each resistive element is positioned between two adjacent supports. Thus pressure applied to the front outer face of the airbag module cover will cause the rear inner face to deformably depress towards the bend sensor causing at least one force concentrator to bend at least one resistive element about two adjacent supports. The force concentrators and supports are arranged to bend the resistive elements in substantially one axis or direction.

According to one aspect of the present invention, the improvement comprises arranging the resistive elements of the bend sensor into parallel, spaced-apart columns. The force concentrators comprise parallel, spaced-apart, elongated force concentration ribs that are generally perpendicular to the columns of resistive elements, and the supports comprise parallel spaced-apart elongated support ribs arranged so that the support ribs are generally parallel to and offset from the force concentration ribs so that each resistive element is positioned between two adjacent support ribs. The force concentration ribs translate a localized force applied to the airbag module cover into a distributed force over more than one resistive element.

According to another aspect of the present invention, the bend sensor has slits located on opposites sides of the columns of resistive elements that allow the resistive elements to bend more easily in one axis or direction and prevent wrinkling of the bend sensor.

The present invention, therefore, provides a horn switch assembly that prevents inadvertent horn actuation due to temperature variations, curvature of the cover, and close packing of the horn switch assembly and folded airbag cushion. The force concentration ribs and support ribs bend the resistive elements in substantially one direction and distribute a driver applied force over more than one resistive element. The horn switch assembly according to the present invention efficiently transmits a driver applied force to the bend sensor and requires only a reasonable amount of driver applied force and cover depression to be activated.

The invention together with further objects, features, advantages and aspects thereof, will be more clearly understood from the following description taken in connection with the accompanying drawings.

BRIEF DESCRIPTION OF THE DRAWINGS

The same reference numerals refer to the same elements throughout the various figures.

DETAILED DESCRIPTION OF THE INVENTION

Figure 1:
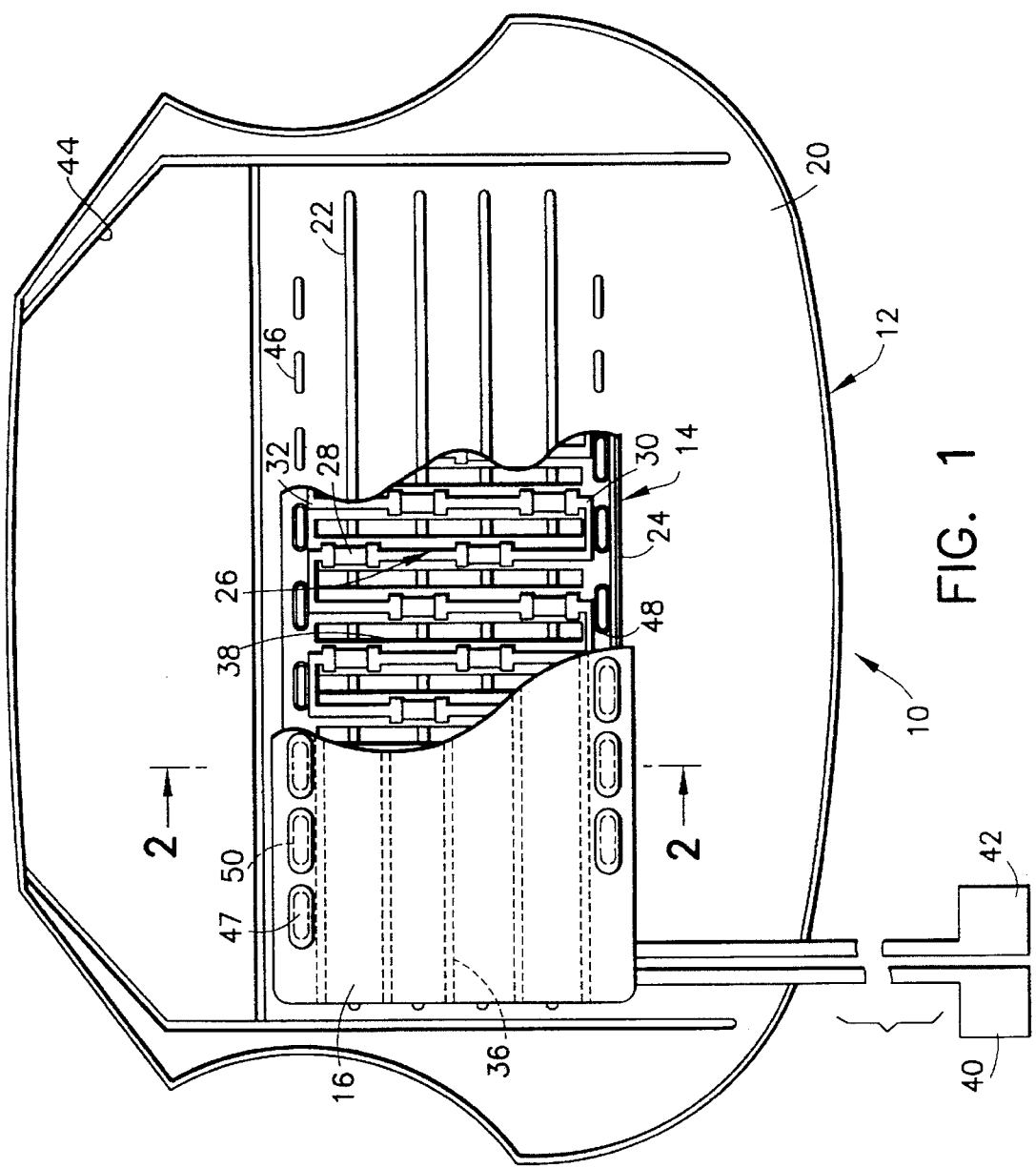
FIG. 1 is a rear elevation view, partially cut away, of a horn switch assembly according to the present invention.
Figure 2:
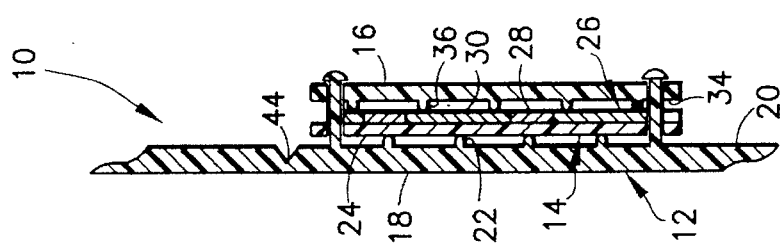
FIG. 2 is a cross sectional view of the horn switch assembly taken along the line 2—2 of FIG. 1.

Referring to FIGS. 1 and 2, the bend sensor horn switch assembly, generally represented by the reference numeral 10, includes an airbag module cover 12, a bend sensor, generally represented by the reference numeral 14, and a backing plate 16. The bend sensor horn switch assembly 10 is for use in a driver side airbag module assembly which is mounted in the hub of an automobile steering wheel and also includes an airbag cushion. How an airbag module assembly is mounted within a steering wheel of an automobile, and how an airbag module assembly works are both known in the art and, accordingly, are not described in detail as they do not in themselves constitute features of the present system. Only the bend sensor horn switch assembly 10 according to the present invention, including the airbag module cover 12, will be described in detail. The airbag module cover 12 has a front outer face 18 and a rear inner face 20, and the rear inner face 20 is deformably depressible from the front outer face 18. A plurality of force concentrators comprising parallel, spaced-apart, elongated force concentration ribs 22 are located on, and preferably formed integrally with, the rear inner face 20 of the cover 12 and extend rearwardly therefrom.

The bend sensor 14 is positioned under the force concentration ribs 22 and includes a flexible substrate 24 and a variable resistance circuit 26 connectable to a remote horn control circuit. The variable resistance circuit 26 has a plurality of spaced-apart resistive elements 28 connected by a plurality of conductive strips 30, and the variable resistance circuit 26 is arranged in a plurality of parallel spaced-apart columns 32. As is known in the art, the resistance of the variable resistance circuit 26 changes as the resistive elements 28 are bent. The variable resistance circuit 26 is adhered to the flexible substrate 24 so that the columns 32 are generally perpendicular to the force concentration ribs 22 and each resistive element 28 is positioned under a force concentration rib 22.

The generally rigid backing plate 16 has a forward surface 34 positioned under and substantially covering the bend sensor 14. A plurality of supports comprising parallel spaced-apart elongated support ribs 36 are located on, and preferably formed integrally with, the forward surface 34 of the backing plate 16 and extend forwardly therefrom. The support ribs 36 are arranged generally parallel to and offset from the force concentration ribs 22 and generally perpendicular to the bend sensor columns 32 so that each conductive strip 30 is positioned over a support rib 36 and each resistive element 28 is positioned between two adjacent support ribs 36. Thus pressure applied to the front outer face 18 of the airbag module cover 12 will cause the rear inner face 20 to deformably depress towards the bend sensor 14 causing at least one force concentration rib 22 to bend at least one resistive element 28 about two adjacent support ribs 36.

The force concentration ribs 22 and support ribs 36, in combination, assure that the resistive elements 28 of the bend sensor 14 are bent in substantially one axis or direction. In addition, the force concentration ribs 22 distribute a localized force applied to the airbag module cover 12 to more than one resistive element 28. The present invention, therefore, provides a horn switch assembly 10 that more efficiently transmits force applied to the airbag module cover 12 to the bend sensor 14 and requires only a reasonable amount of driver applied force and cover depression to be actuated.

Referring to FIG. 2, the flexible substrate 24 is shown with a thickness that is substantially disproportionate to its true thickness solely to facilitate illustration. The flexible substrate 24 of the bend sensor 14 comprises electrical insulating material such as a suitable plastic material, for example MYLAR polyester or polyethylene with a thickness of approximately 0.10 millimeters. As shown in FIG. 1, the flexible substrate 24 also includes slots 38 located between the columns 32 of the variable resistance circuit 26. The slots 38 allow the resistive elements 28 in each column 32 to bend more easily in substantially one direction and, in the alternative, the flexible substrate 24 could simply include slits located on opposites sides of each column 32 of the variable resistance circuit 26.

The variable resistance circuit 26 basically comprises a flexible potentiometer, known in the art. Still referring to FIG. 2, the conductive strips 30 and resistive elements 28 are shown to have a thickness which is substantially disproportionate to their true thickness solely for purposes of illustration. The conductive strips 30 of the variable resistance circuit 26 comprise a flexible electrical conductive coating that may be applied to the flexible substrate 24 by any suitable means, such as for example, by screening conductive ink thereon. The resistive elements 28 of the variable resistance circuit 26 generally comprise a flexible electrical conductive coating that may also be applied to the flexible substrate 24 by any suitable means, such as for example, by screening conductive ink thereon. The resistive elements 28 contain flexible carbon fibers which separate when the resistive elements 28 are bent in a particular direction. As the carbon fibers separate the resistance of the resistive elements 28 increase, changing the resistance of the variable resistance circuit 26. The variable resistance circuit 26 also includes leads 40 and 42. One lead 40 or 42 is connectable to a remote power supply while the other lead 42 or 40 is connectable to a remote horn control circuit utilized to actuate a remote horn that the horn switch assembly 10 is designed to operate.

The remote horn control circuit closes a circuit between a remote power supply and the remote horn when the driver presses against the front outer face 18 of the airbag module cover 12 with at least a threshold amount of force. The threshold amount of force causes the bend sensor 14 to bend and the resistance of the bend sensor 14 to measurably change. A preferred horn control circuit only responds to rapid changes in the resistance of the bend sensor 14 but not to more gradual changes. Normally, thermal expansion or contraction of the airbag module cover 12, curvature of the cover 12 or close packing of the horn switch assembly 10 and a folded airbag cushion (not shown) normally contained in an airbag module assembly may bend the bend sensor 14 and change the resistance of the bend sensor 14 enough to inadvertently actuate the horn. However, the rate of change of resistance is very slow. The horn control circuit, therefore, prevents inadvertent actuation of the horn. Generally,, only a force applied by a driver pressing on the airbag module cover 12 will have the required rate of change of resistance necessary to actuate the horn. Those skilled in the art will appreciate that a variety of circuits may be employed to carry out the functions of a preferred horn control circuit. The horn control circuit may include a microprocessor that can be programmed to meet the specific requirements of an automotive manufacturer.

The substantially rigid backing plate 16 is comprised of suitable material, such as polyester, having a thickness of approximately 1 to 2 millimeters to provide the desired rigidity. Other materials, such as for example, rigid fiberglass may be employed. Because of the additional stiffness of this material a thickness of only approximately 0.8 millimeters is required. The bend sensor 14 and backing plate 16 as shown in FIG. 1 are generally rectangular but can be contoured to match the shape of an airbag module cover 12 k.y using a thermal forming operation so that the bend sensor 14 and backing plate 16 could also be square or circular, for example.

The bend sensor 14 and backing plate 16 are attached to the airbag module cover 12 which includes at least one tear line 44 that breaks open upon inflation of the airbag cushion. The front outer face 18 of the airbag module cover 12 is utilized as a horn actuation area, that is, an area where force is applied to bend the bend sensor 14 and actuate the remote horn. A plurality of spaced-apart stakes 46 having distal ends 47 that extend rearwardly from the rear inner face 20 and are arranged in a predetermined pattern. Preferably the stakes 46 are integrally formed in the cover 12. The flexible substrate 24 of the bend sensor 14 has a plurality of spaced-apart mounting openings 48 arranged along the periphery of the substrate 24 in the same predetermined pattern as the plurality of spaced-apart stakes 46. The backing plate 16 also has a plurality of spaced-apart mounting openings 50 arranged along the periphery of the backing plate 16 in the same predetermined pattern as the plurality of spaced-apart stakes 46. The stakes 46 extending through the mounting openings 48 in the flexible substrate 24 and the mounting openings 50 in the backing plate 16 with the distal ends 47 of the stakes 46 securing the flexible substrate 24 and the backing plate 16 to the airbag module cover 12. In assembly, the bend sensor 14 and backing plate 16 are secured to the cover 12 such as by the distal ends 47 of the stakes 46 being mushroomed, such as by using ultrasound or any other suitable type of heat to provide thermal staking. Ultrasound welding is preferred so that heat is not introduced near the bend sensor 14 during the assembly process, to reduce the risk of damage to the bend sensor 14. It will be appreciated that whichever process is utilized in securing the bend sensor 14 and backing plate 16 to the airbag module cover 12, they must be sufficiently secured thereto so that they will not be separated from the cover 12 upon inflation of the airbag cushion.

Since other requirements and environments varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

We claim:

1. In a horn switch assembly for mounting on a steering wheel of a motor vehicle and comprising an airbag module cover having a front outer face and a rear inner face, a substantially rigid backing plate positioned so that a forward surface of the backing plate faces the rear inner face of the module cover, and a flexible bend sensor connectable to a remote horn control circuit that responds to a threshold rate of change of resistance, the bend sensor positioned between the rear inner face of the module cover and the forward surface of the backing plate, whereby pressure applied to the front outer face of the module cover causes at least one of a plurality of resistive elements in the bend sensor to bend and rapidly change resistance so that the remote horn control circuit activates a horn, the improvement comprising:

a plurality of force concentrators on the rear inner face of the cover extending rearwardly therefrom and positioned over the resistive elements of the bend sensor;

a plurality of spaced-apart supports on the forward surface of the backing plate, extending forwardly therefrom and arranged so that each resistive element is positioned between two adjacent supports, whereby pressure applied to the front outer face of the airbag module cover will cause the rear inner face to deformably depress towards the bend sensor causing at least one force concentrator to bend at least one resistive element about two adjacent supports.

2. The horn switch assembly of claim 1 wherein the resistive elements of the bend sensor are arranged in parallel, spaced-apart columns, the force concentrators comprise parallel, spaced-apart, elongated force concentration ribs that are generally perpendicular to the columns of resistive elements, and the supports comprise parallel spaced-apart elongated support ribs arranged so that the support ribs are generally parallel to and offset from the force concentration ribs so that each resistive element is positioned between two adjacent support ribs.

3. The horn switch assembly of claim 2 wherein the bend sensor has slits located on opposites sides of the columns of resistive elements.

4. A horn switch assembly for mounting in a steering wheel of a motor vehicle comprising:

an airbag module cover having a front outer face and a rear inner face, the rear inner face deformably depressible from the front outer face;

a plurality of force concentrators on the rear inner face of the cover and extending rearwardly therefrom;

a bend sensor positioned under the force concentrators and including a flexible substrate and a variable resistance circuit connectable to a horn control circuit, the variable resistance circuit having a plurality of spaced-apart resistive elements connected by a plurality of conductive strips, the variable resistance circuit adhered to the flexible substrate and arranged in a pattern on the flexible substrate such that each resistive element is positioned under a force concentrator;

a substantially rigid backing plate having a forward surface positioned under and substantially covering the bend sensor; and a plurality of spaced-apart supports on the forward surface of the backing plate and extending forwardly therefrom and arranged in a pattern so that each support is positioned under a conductive strip and each resistive element is positioned between two adjacent supports, whereby pressure applied to the front outer face of the airbag module cover will cause the rear inner face to deformably depress towards the bend sensor causing at least one force concentrator to bend a resistive element about two adjacent supports.

5. A horn switch assembly for mounting in a steering wheel of a motor vehicle comprising:

an airbag module cover having a front outer face and a rear inner face, the rear inner face deformably depressible from the front outer face;

a plurality of parallel, spaced-apart, elongated force concentration ribs on the rear inner face of the cover and extending rearwardly therefrom;

a bend sensor positioned under the force concentrators and including a flexible substrate and a variable resistance circuit connectable to a horn control circuit, the variable resistance circuit having a plurality of spaced-apart resistive elements connected by a plurality of conductive strips, the variable resistance circuit arranged in a plurality of parallel spaced-apart columns and adhered to the substrate so that the columns are generally perpendicular to the force concentration ribs and each resistive element is positioned under a force concentration rib;

a generally rigid backing plate having a forward surface positioned under and substantially covering the bend sensor; and a plurality of parallel spaced-apart elongated support ribs on the forward surface of the backing plate and extending forwardly therefrom and arranged so that the support ribs are generally parallel to and offset from the force concentration ribs and are generally perpendicular to the bend sensor columns so that each conductive strip is positioned over a support rib and each resistive element is positioned between two adjacent support ribs, whereby pressure applied to the front outer face of the airbag module cover will cause the rear inner face to deformably depress towards the bend sensor causing at least one force concentration rib to bend at least one resistive element about two adjacent support ribs.

6. The horn switch assembly of claim 5 wherein the flexible substrate of the bend sensor has slits located on opposites sides of each variable resistance circuit column.

7. The horn switch assembly of claim 5 wherein the flexible substrate of the bend sensor has slots located between the variable resistance circuit columns.

8. The horn switch assembly of claim 5 wherein the plurality of force concentration ribs are integral with the cover and the plurality of support ribs are integral with the backing plate.

9. The horn switch assembly of claim 5 wherein the backing plate is secured to the rear inner face of the airbag module cover retaining the bend sensor therebetween.

10. The horn switch assembly of claim 5 wherein the airbag module cover has a plurality of spaced-apart stakes extending rearwardly from the rear inner face, the stakes arranged in a predetermined pattern, the flexible substrate having a plurality of spaced-apart mounting openings arranged along the periphery of the substrate in the same predetermined pattern as the plurality of spaced-apart stakes, the backing plate having a plurality of spaced-apart mounting openings arranged along the periphery of the backing plate in the same predetermined pattern as the plurality of spaced-apart stakes, the stakes extending through the mounting openings in the flexible substrate and the mounting openings in the backing plate with the distal ends of the stakes securing the flexible substrate and the backing plate to the airbag module cover.

11. The horn switch assembly of claim 7 wherein the plurality of force concentration ribs are integral with the cover and the plurality of support ribs are integral with the backing plate.

12. The horn switch assembly of claim 11 wherein the airbag module cover has a plurality of spaced-apart stakes extending rearwardly from the rear inner face, the stakes arranged in a predetermined pattern, the flexible substrate having a plurality of spaced-apart mounting openings arranged along the periphery of the substrate in the same predetermined pattern as the plurality of spaced-apart stakes, the backing plate having a plurality of spaced-apart mounting openings arranged along the periphery of the backing plate in the same predetermined pattern as the plurality of spaced-apart stakes, the stakes extending through the mounting openings in the flexible substrate and the mounting openings in the backing plate with the distal ends of the stakes securing the flexible substrate and the backing plate to the airbag module cover.

* * * * *

UNITED STATES PATENT AND TRADEMARK OFFICE
CERTIFICATE OF CORRECTION

PATENT NO.   : 5,625,333
DATED        : April 29, 1997
INVENTOR(S)  : Clark et al.

It is certified that error appears in the above-indentified patent and that said Letters Patent is hereby corrected as shown below:

```
Title Page, Abstract, Ln. 12, correct "a plural of"
     to read -- plural -- .
Col. 5, Ln. 44, correct "k,y" to read -- by -- .
Col. 6, Ln. 29, correct "sensor positioned" to read
     -- sensor including a plurality of resistive elements
     positioned --.
```

Signed and Sealed this

Eighteenth Day of November 1997

Attest:

BRUCE LEHMAN

Attesting Officer

Commissioner of Patents and Trademarks